(12) United States Patent
Wang et al.

(10) Patent No.: US 9,849,909 B2
(45) Date of Patent: Dec. 26, 2017

(54) TOWABLE AGRICULTURAL IMPLEMENT HAVING AUTOMATIC STEERING SYSTEM

(75) Inventors: Guoping Wang, Naperville, IL (US);
Keith Wendte, Willowbrook, IL (US);
Charles Johnson, Serena, IL (US);
Marvin Prickel, Homer Glen, IL (US);
John Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 1294 days.

(21) Appl. No.: 12/615,830

(22) Filed: Nov. 10, 2009

(65) Prior Publication Data
US 2011/0112721 A1    May 12, 2011

(51) Int. Cl.
*G05D 1/00*   (2006.01)
*B62D 13/00*  (2006.01)
*B62D 13/04*  (2006.01)
*A01B 69/00*  (2006.01)

(52) U.S. Cl.
CPC .......... *B62D 13/04* (2013.01); *A01B 69/004* (2013.01); *B62D 13/005* (2013.01)

(58) Field of Classification Search
USPC ............................................. 701/50
See application file for complete search history.

(56) References Cited

U.S. PATENT DOCUMENTS

| | | |
|---|---|---|
| 2,780,158 A | 2/1957 | Pursche |
| 2,982,363 A | 5/1961 | Sweet et al. |
| 3,288,480 A | 11/1966 | Calkins et al. |
| 4,098,346 A | 7/1978 | Stanfill et al. |
| 4,282,935 A | 8/1981 | Dietrich |
| 4,350,190 A | 9/1982 | McColl |

(Continued)

FOREIGN PATENT DOCUMENTS

FR    2751165    7/1997

OTHER PUBLICATIONS

Orthman Agricultural, Tracker IV Implement Guidance System Web Page, http://www.orthman/com/htm1603/tracker-IV.html, accessed Nov. 26, 2008.

(Continued)

*Primary Examiner* — Adam Tissot
(74) *Attorney, Agent, or Firm* — Rebecca L. Henkel; Rickard K. DeMille (57) ABSTRACT

A steering system for a towable implement includes a steering sensor, an implement steering controller, a steering control valve, a steering cylinder, and an implement steering mechanism that steers the implement. The steering sensor measures, directly or indirectly, the angular position of the steerable wheels of the implement. The implement steering controller processes feedback from the steering sensor and with a desired steering angle, outputs a steering control signal that is input to the steering control valve. The steering control valve controls the flow of hydraulic fluid to the steering cylinder, which, in turn, powers the implement steering mechanism to turn the wheels of the implement. The steering system may be operated in various control modes, such as, a transportation steering mode, a corner and 180 turn steering mode, a swath tracking steering mode, crab steering mode, and a manual steering mode, which allows manual control of the steering system.

20 Claims, 11 Drawing Sheets

(56) References Cited

U.S. PATENT DOCUMENTS

| | | | |
|---|---|---|---|
| 4,359,105 A | 11/1982 | Van Natta | |
| 4,709,857 A * | 12/1987 | Wilger | A01M 7/0075 |
| | | | 239/164 |
| 4,943,078 A | 7/1990 | McGhie et al. | |
| 4,944,355 A | 7/1990 | Karchewski | |
| 5,048,629 A | 9/1991 | Abe et al. | |
| 5,154,240 A | 10/1992 | Carrick | |
| 5,244,226 A | 9/1993 | Bergh | |
| 5,329,451 A | 7/1994 | Notsu | |
| 5,477,937 A | 12/1995 | Chagnon | |
| 5,570,754 A | 11/1996 | Stimson | |
| 5,607,028 A | 3/1997 | Braun et al. | |
| 5,904,365 A | 5/1999 | Dillon | |
| 6,179,315 B1 | 1/2001 | Boriack | |
| 6,431,576 B1 * | 8/2002 | Viaud | B62D 13/025 |
| | | | 280/419 |
| 6,434,462 B1 | 8/2002 | Bevly et al. | |
| 6,494,476 B2 | 12/2002 | Masters et al. | |
| 6,553,299 B1 | 4/2003 | Keller et al. | |
| 6,722,610 B1 | 4/2004 | Rawdon et al. | |
| 6,804,597 B1 | 10/2004 | Posselius et al. | |
| 6,865,465 B2 | 3/2005 | McClure | |
| 7,147,241 B2 | 12/2006 | Beaujot et al. | |
| 7,269,489 B2 | 9/2007 | Deng et al. | |
| 7,373,231 B2 * | 5/2008 | McClure | A01B 69/004 |
| | | | 280/456.1 |
| 7,383,114 B1 | 6/2008 | Lange et al. | |
| 7,410,004 B2 * | 8/2008 | Meier | A01B 51/026 |
| | | | 172/450 |
| 2008/0048414 A1 | 2/2008 | Van Mill et al. | |
| 2008/0195268 A1 * | 8/2008 | Sapilewski | A01B 69/004 |
| | | | 701/23 |

OTHER PUBLICATIONS

Bill Strautman, "Rear Steer Keeps Seed Hawk on Steep Hills", Western Producer Newspaper, Apr. 1, 2004, p. 103, Saskatoon, CA.
Options-Rear Wheel Steering, Seed Hawk Product Literature.

* cited by examiner

FIG. 6A

TOWABLE AGRICULTURAL IMPLEMENT HAVING AUTOMATIC STEERING SYSTEM

BACKGROUND OF THE INVENTION

The present invention relates generally to agricultural implements and, more particularly, to a steering system for an agricultural implement, such as a towed planter, that can automatically steer the implement during field operations or road transport.

Conventional agricultural implements are designed to follow the motion of a towing vehicle, such as a tractor. In this regard, most agricultural implements are passively steered principally by the tractor rather than have their own steering mechanisms. However, increasingly, there is a desire for implements that are capable of limited self-steering. That is, in some situations, it may be desirable for the implement to be steered so as to maintain alignment with the tractor when the tractor is moving across a sloped area or avoiding an obstruction, such as a mailbox.

A number of steering systems have been developed as an aftermarket add-on to make a non-steerable implement steerable. One such system is GPS-based that is mounted to the toolbar of the non-steerable implement. Such add-on systems generally have two subsystems: the steering subsystem that mechanically causes steering of the implement and the auto-guidance subsystem (GPS, for example) that controls the steering subsystem. These subsystems can be quite costly and ultimately cost prohibitive. For example, it is not uncommon for the steering subsystem alone to cost several thousands of dollars with additional costly expense for the auto-guidance subsystem. Also, after market systems are design to provide implement steering during field operation and do not provide steering function while transporting. Additionally, for many aftermarket add-on systems, the implement must be mechanically modified, which may not be practical for some types of implements, such as folding planters, or negate warranties for the implement.

Moreover, steerable implements have been limited heretofore in the type of available movements. For example, many steerable implements have systems that are designed to maintain alignment of the implement with the tractor. While there is a need in some circumstances to maintain such alignment, a steerable implement that can be steered intentionally along an offset track may be desirable in other circumstances, such as during transport. Additionally, it is desirable to have an implement that can be automatically controlled to turn or otherwise corner during field operations. Automatic implement swath tracking during field operation would also be desirable.

SUMMARY OF THE INVENTION

In one aspect of the invention, a steering system for a towable implement includes a steering sensor, an implement steering controller, a steering control valve, a steering cylinder, and an implement steering mechanism that steers the implement. The steering sensor, which may be a rotary position sensor or linear position sensor, measures, directly or indirectly, the angular position of the steerable wheels of the implement. The implement steering controller processes feedback from the steering sensor and with a desired steering angle, outputs a steering control signal that is input to the steering control valve. The steering control valve controls the flow of hydraulic fluid to the steering cylinder, which, in turn, "powers" the implement steering mechanism to turn the wheels of the implement. The steering system may be operated in various control modes, operator selectable or automatic based upon criteria, such as, a transportation steering mode, a corner and 180 turn steering mode, a swath tracking steering mode, crab steering mode, and a manual steering mode, which allows manual control of the steering system. Preferably, the implement is towed by a tractor or other prime mover having a GPS system, such as an auto-guidance tractor. Information as to the position of the tractor as provided by the GPS system of the tractor is provided to and processed by the implement steering controller to provide a suitable steering control signal. The implement may be auto-steered in both forward and reverse directions.

It is therefore an object of the invention to provide a towable and steerable implement.

It is another object of the invention to provide an automatic steering system for a towable implement.

It is yet a further object of the invention to provide an automatic steering system that can be selectively operated in various modes.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
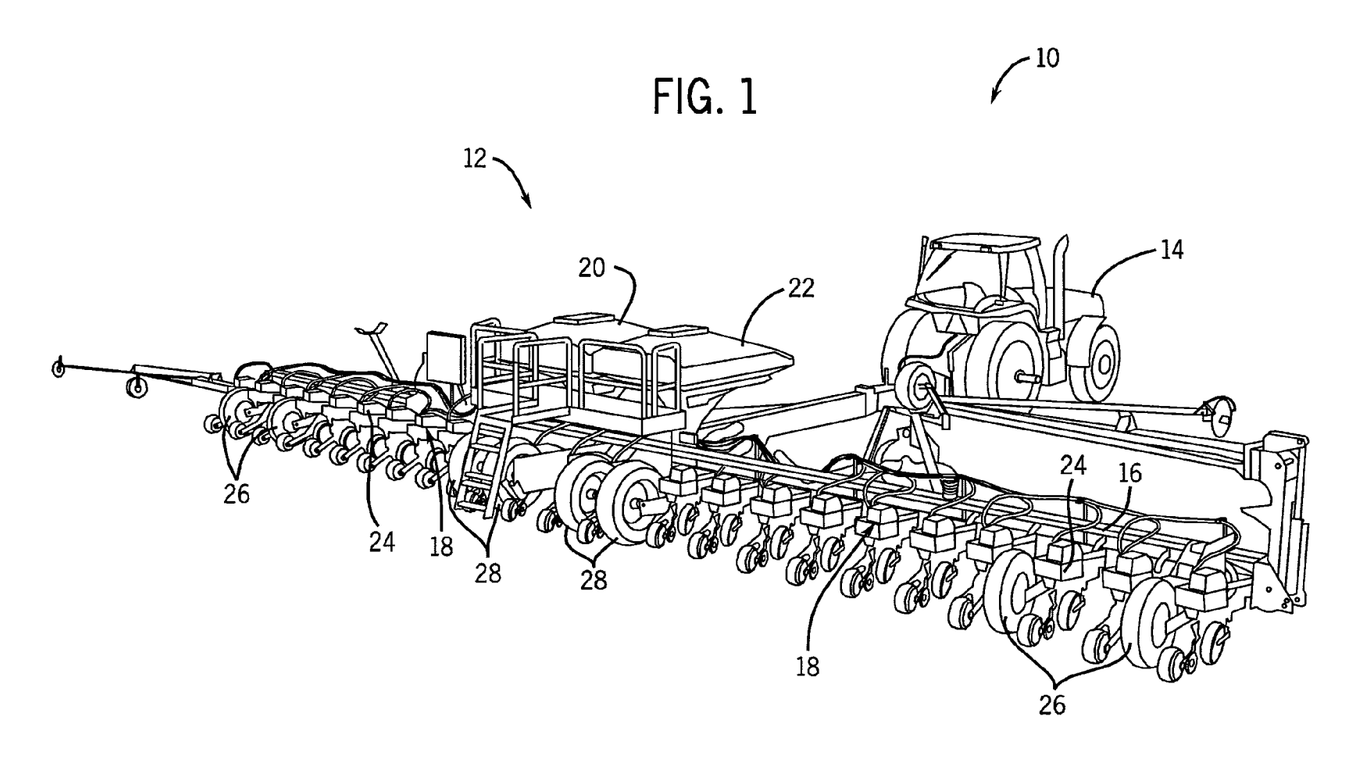
FIG. 1 is a pictorial view of an agricultural system comprising a steerable agricultural implement shown hitched to a towing vehicle according to the invention.

Referring now to the drawings, and more particularly to FIG. 1, an exemplary agricultural system 10 includes an agricultural implement, such as a planter 12, hitched in a conventional manner to a prime mover, such as tractor 14. The planter 12 includes a frame 16 supporting a plurality of spaced apart row units 18 that deposit granular material, such as seed, onto a planting surface. Preferably, two bulk fill tanks 20, 22 are supported by the frame 16 and may be filled with seed or other granular material for subsequent passage to the individual row units 18, which may have individual row hoppers 24, in a conventional manner. The implement frame 16 is supported above the farm field by two pairs of outer wheels 26 and two pairs of inner wheels 28. As will be described in greater detail below, the inner wheels 28 may be auto-steered so that the implement is not only towed by the tractor 14 but is steered according to one of a number of operating modes, e.g., transportation steering mode, cornering steering mode, swath tracking mode, and crab steering mode. While a planter 12 is shown, it is understood that the invention is applicable with other types of agricultural implements in which it is desirable to provide auto-steering of the implement.

Figure 2:
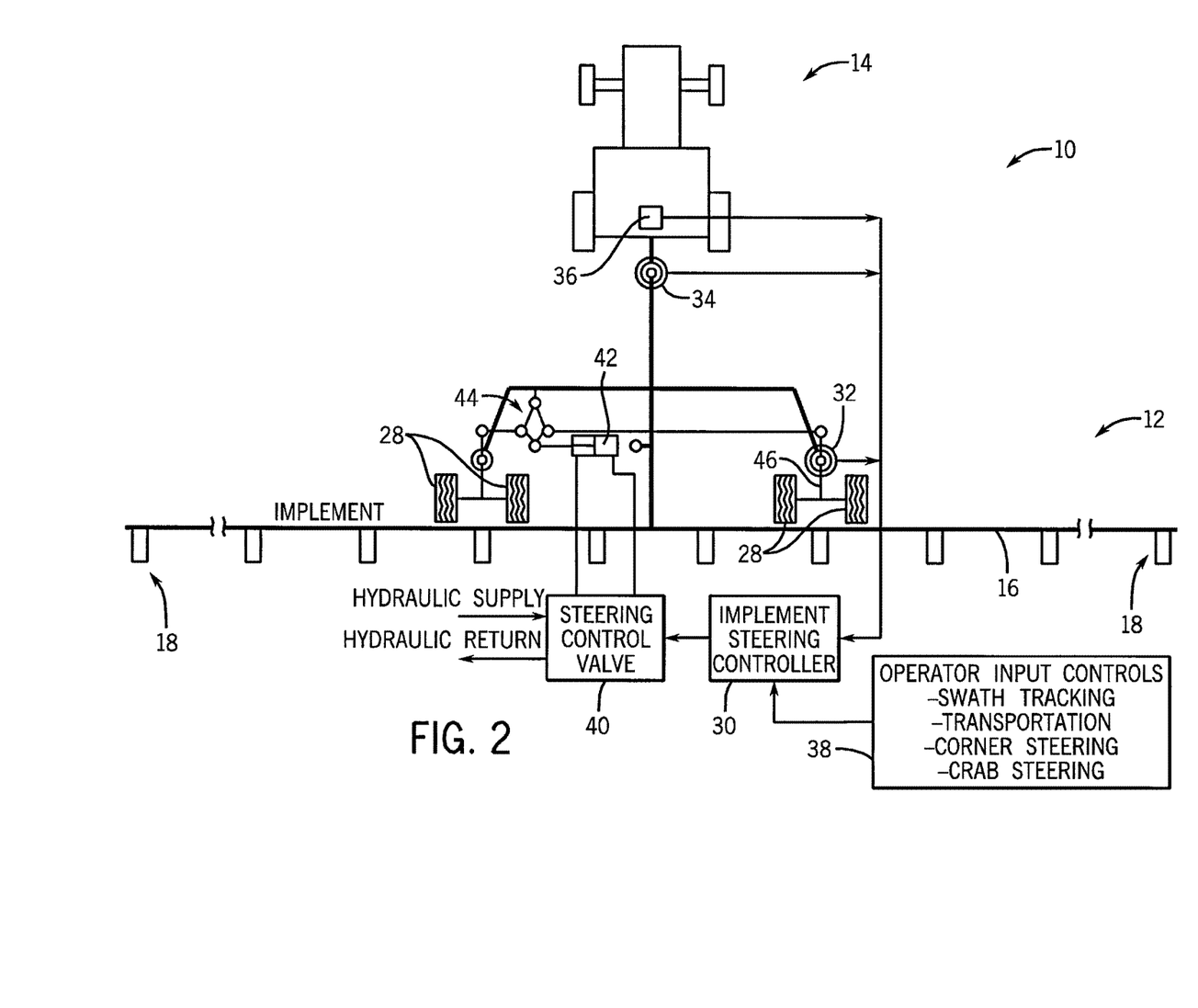
FIG. 2 is a schematic representation of the agricultural system of FIG. 1 according to a first embodiment of the invention.
Figure 2A:
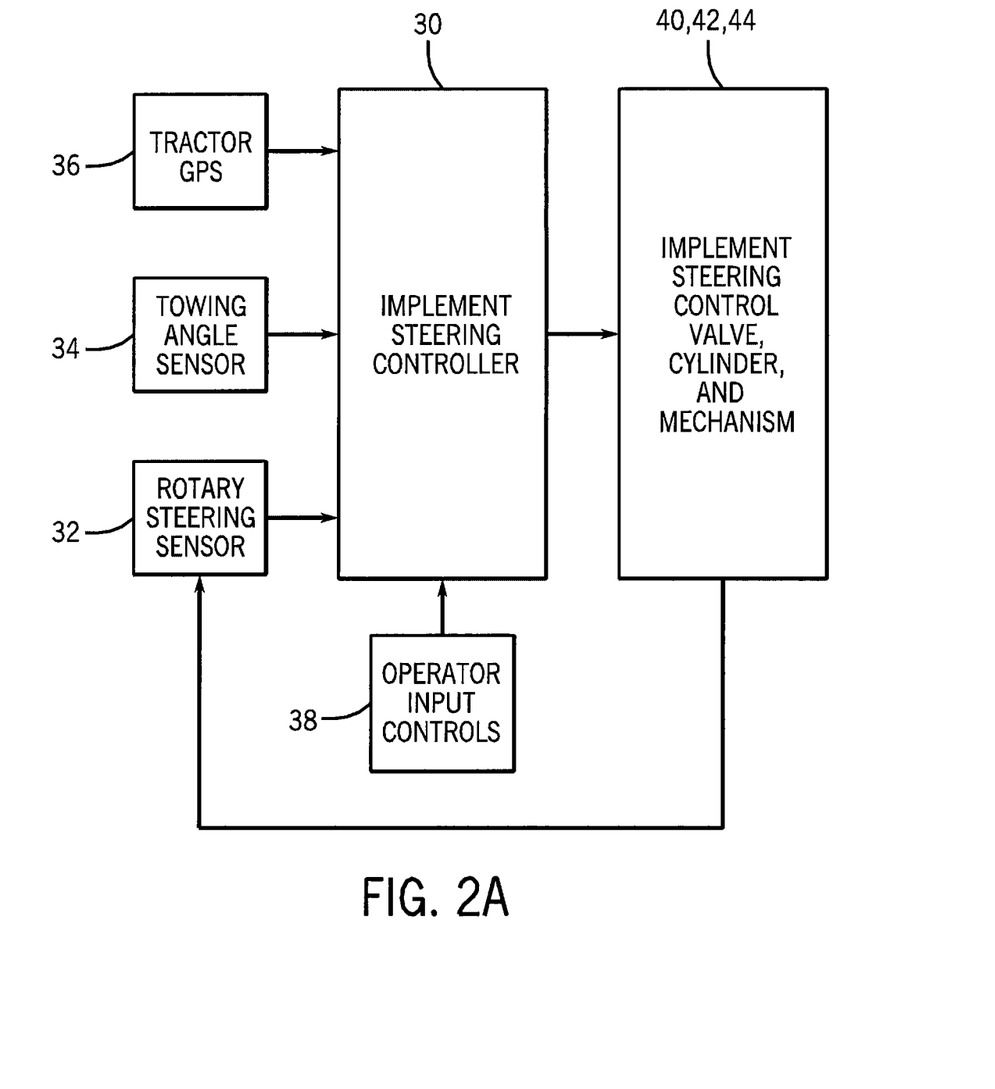
FIG. 2A is a schematic representation of an implement control system for use with the agricultural system shown in FIG. 2.

FIG. 2 schematically illustrates one embodiment of the present invention for auto-steering a towable implement, such as planter 12, by a prime mover, e.g., tractor 14. In this first illustrated embodiment, auto-steering of the planter 12 is controlled by an implement steering controller 30 that receives information from a rotary steering sensor 32, a towing angle sensor 34, and a tractor GPS receiver 36, as well as operator input controls 38, which are preferably contained within the operator cab (not numbered) of the tractor 14. From the information provided by the aforementioned sensors 32 and 34, the receiver 36, and the operator controls, the implement steering controller 30 provides an input signal to a steering control valve 40 which in turn controls the flow of hydraulic fluid to and from a steering cylinder 42 that is operably associated with a steering mechanism 44 that responds to changes in the position of the steering cylinder and, more particularly, a rod (not shown) that is extended or retracted as pressure across the cylinder 42 to turn the wheels 28. It is understood that the steering mechanism 44 could be of any conventional or to-be-developed design. The control system for implement steering control is further illustrated in FIG. 2A. The implement steering controller 30 could be a microprocessor-based electronic control unit. The operator input controls 38 could be a multi-position switch which is wired to the implement steering controller 30. The operator input controls 38 also could be any type of operator interface, such as a touch-screen display, which relays operator inputs to the implement steering controller 30 by means of electronic communication such as CAN bus communication.

In a preferred implementation, the rotary steering sensor 32 is mounted at the pivot axle 46 of the steerable wheels 28. In one preferred embodiment, a single rotary steering sensor 32 is used to measure the angular position of a single pair of inner wheels 28; however, it is understood that two such sensors could be used to measure the angular position of both pairs of inner wheels 28. As referenced above, and further illustrated in FIG. 2A, the rotary sensing sensor 32 provides a feedback signal to the implement steering controller 30, which in turn uses the information embodied in the feedback signal to develop a control signal for the steering control valve 40. It will be appreciated that the steering sensor 32, which may be a rotary position sensor, an inertial sensor, or other type of sensor is capable of providing a direct measurement of the angular position of the pivot axle 46.

The towing angle sensor 34 is preferably mounted to or approximate the hitch point of the implement frame 16 to the tractor 14, and like the rotary position sensor 32 provides a feedback signal to the implement steering controller 30. The signal transmitted by the towing angle sensor 34 is embodied with information containing a direct measurement of the angle of the implement frame 16 to the tractor 14, which is used by the implement steering controller 30 to develop the control signal for the steering control valve 40. It will be appreciated that the towing angle sensor 34 may directly or indirectly measure the angular position of the implement frame 16. Additionally, it will be appreciated that the towing angle sensor 34 may be a rotary position sensor, an inertial sensor, or other type of sensor capable of providing a direct or indirect measurement of the angular displacement of the implement frame 16.

GPS receiver 36 is mounted to the tractor 14 in a known manner and provides a feedback signal to the implement steering controller containing information regarding the position of the tractor 14, which can be used to determine the position of the tractor 14 in a field, along a road, and the like. In one preferred embodiment, the tractor 14 is an auto-guidance tractor using GPS technology as known in the art.

Figure 3:
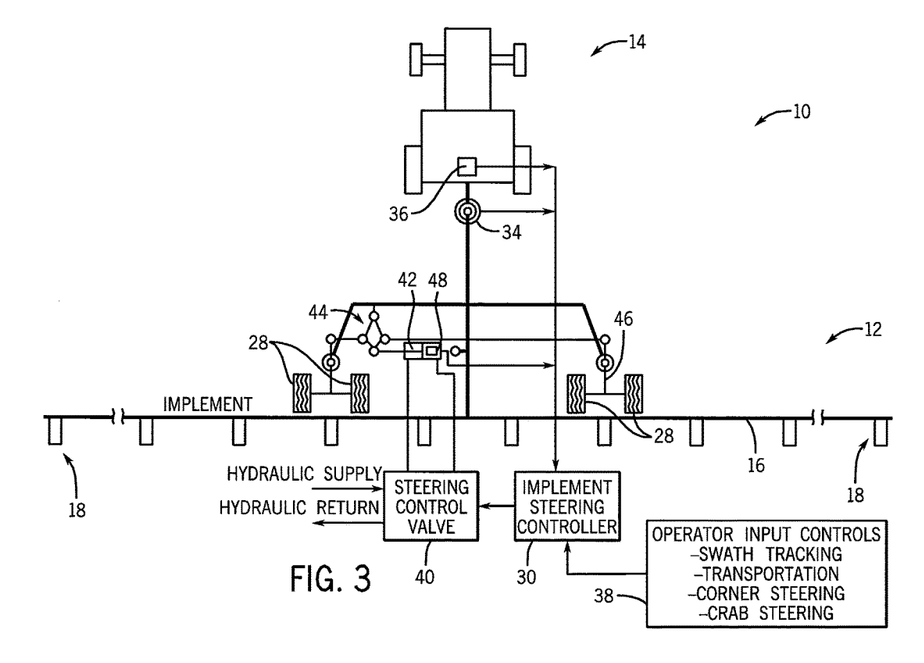
FIG. 3 is a schematic representation of the agricultural system of FIG. 1 according to a second embodiment of the invention.
Figure 3A:
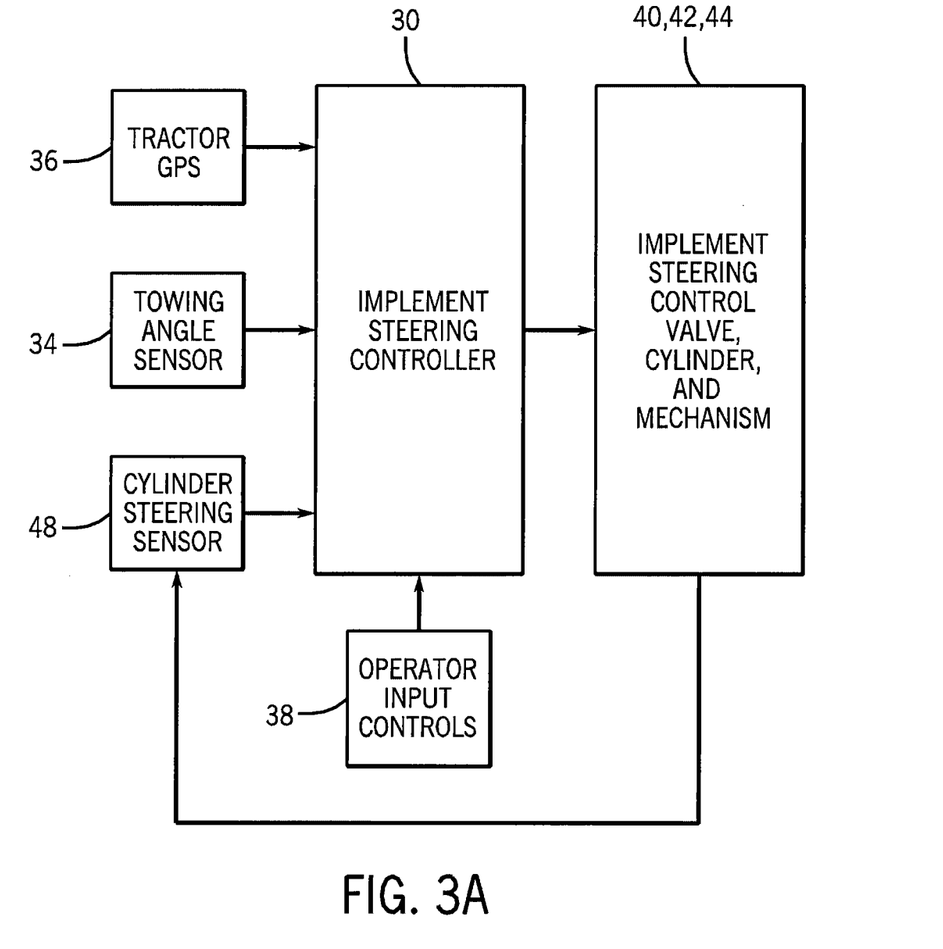
FIG. 3A is a schematic representation of an implement control system for use with the agricultural system shown in FIG. 3.

FIG. 3 illustrates another embodiment of the present invention, and the corresponding control system for the implement steering control is shown in FIG. 3A. In this embodiment, a cylinder steering sensor 48 rather than the aforedescribed rotary steering sensor 32 is used to measure the angular position of the inner wheels 28. More particularly, the cylinder steering sensor 48 is either mounted inside or integral with the external surface of the steering cylinder 42 and measures the displacement of the cylinder rod (not shown). The angular position of the wheels 28 can then be computed by the implement steering controller 30 from the measured cylinder rod displacement together with information regarding the operating parameters of the steering mechanism 44. While in one embodiment the cylinder steering sensor 48 is used instead of a rotary position sensor 32, it is contemplated that both sensors could be used to provide two separate measurements regarding the angular position of the inner wheels 28.

Figure 4:
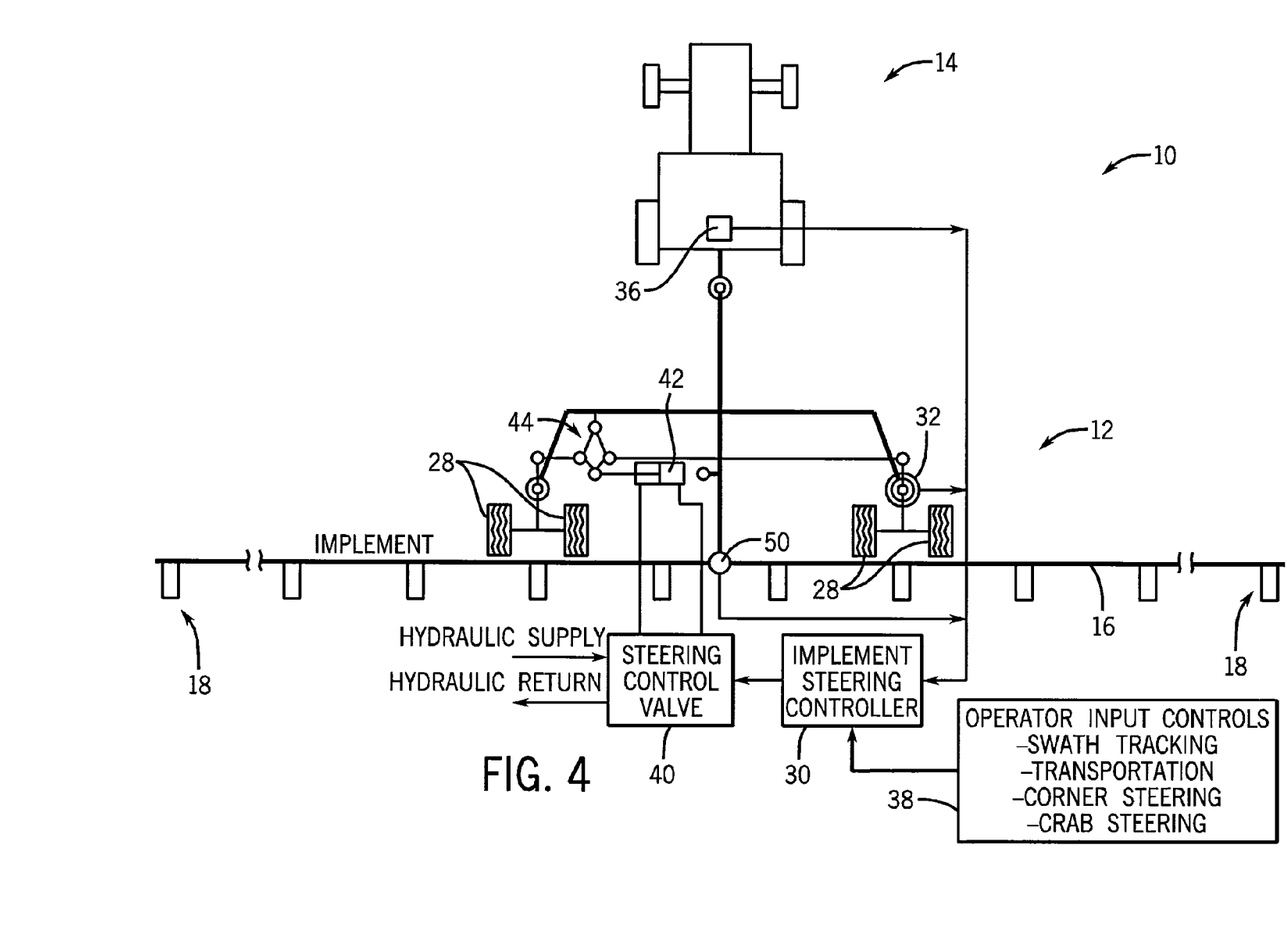
FIG. 4 is a schematic representation of the agricultural system of FIG. 1 according to a third embodiment of the invention.
Figure 4A:
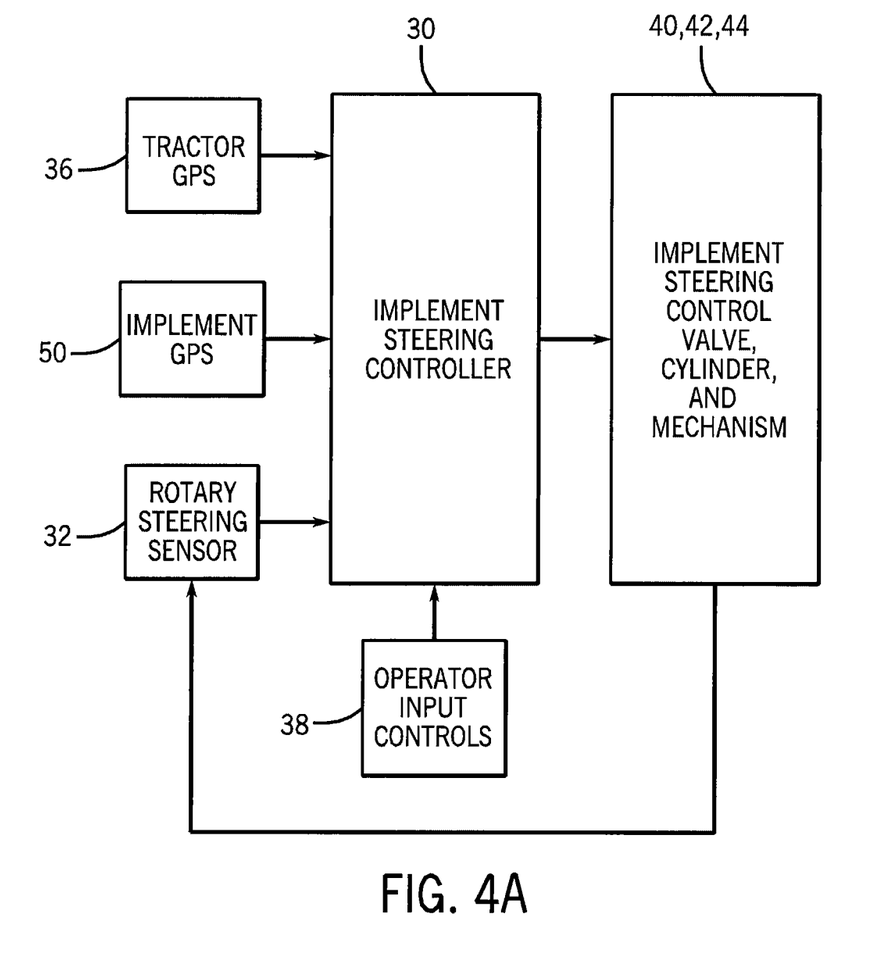
FIG. 4A is a schematic representation of an implement control system for use with the agricultural system shown in FIG. 4.

FIG. 4 illustrates yet another embodiment of the present invention. The control system for the implement steering control of this embodiment is shown in FIG. 4A. In the embodiment illustrated in FIGS. 4 and 4A, an implement GPS receiver 50 is used to measure the field position of the implement 12 rather than a towing angle sensor. In this regard, the GPS receiver 50, which includes an antenna and GPS receiver circuitry, provides a feedback signal to the implement steering controller 30 regarding the field position of the implement 12 and the controller 30 uses the field position information together with feedback from the rotary steering sensor 32, the tractor GPS receiver 36, and operator input controls to develop a control signal for the steering control valve 40.

Figure 5:
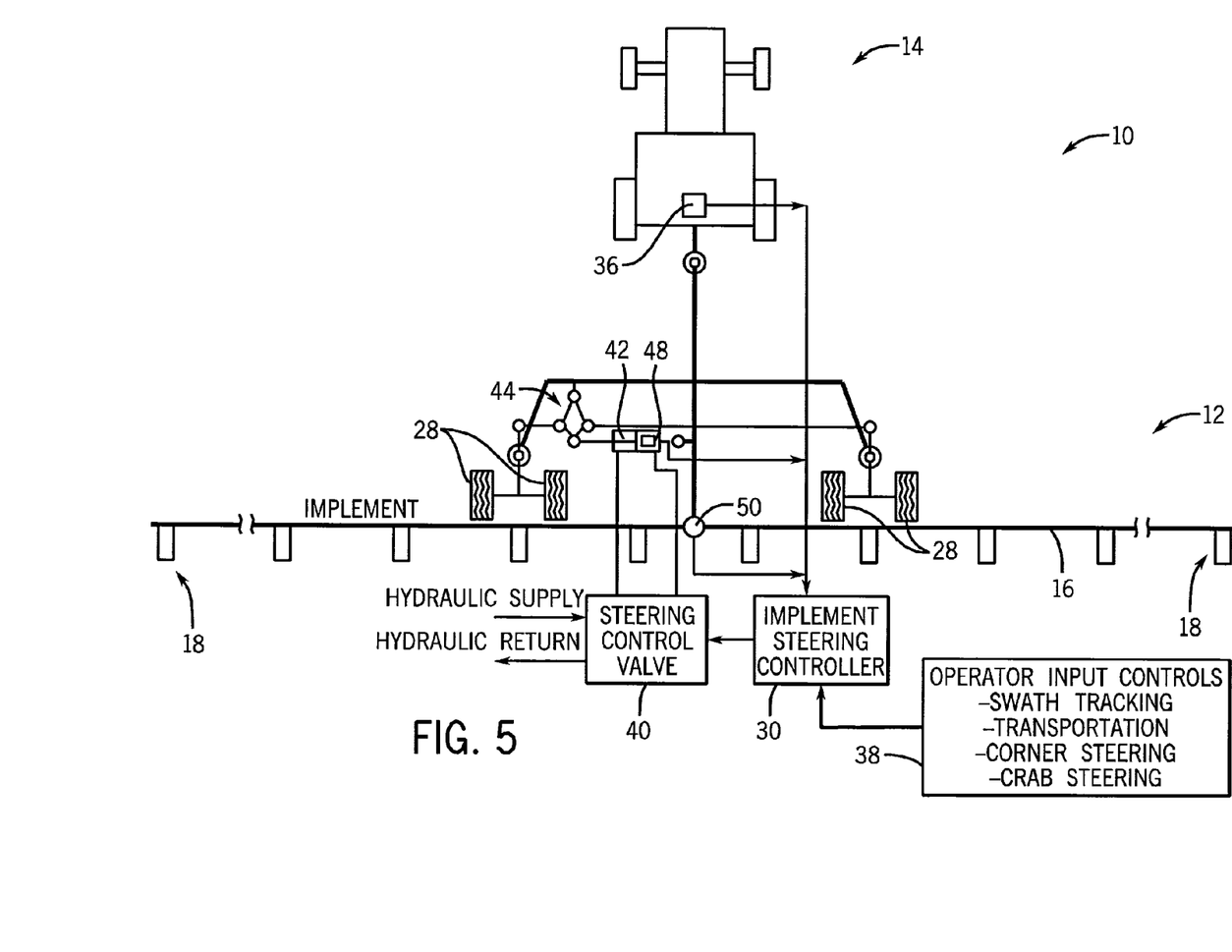
FIG. 5 is a schematic representation of the agricultural system of FIG. 1 according to a fourth embodiment of the invention.
Figure 5A:
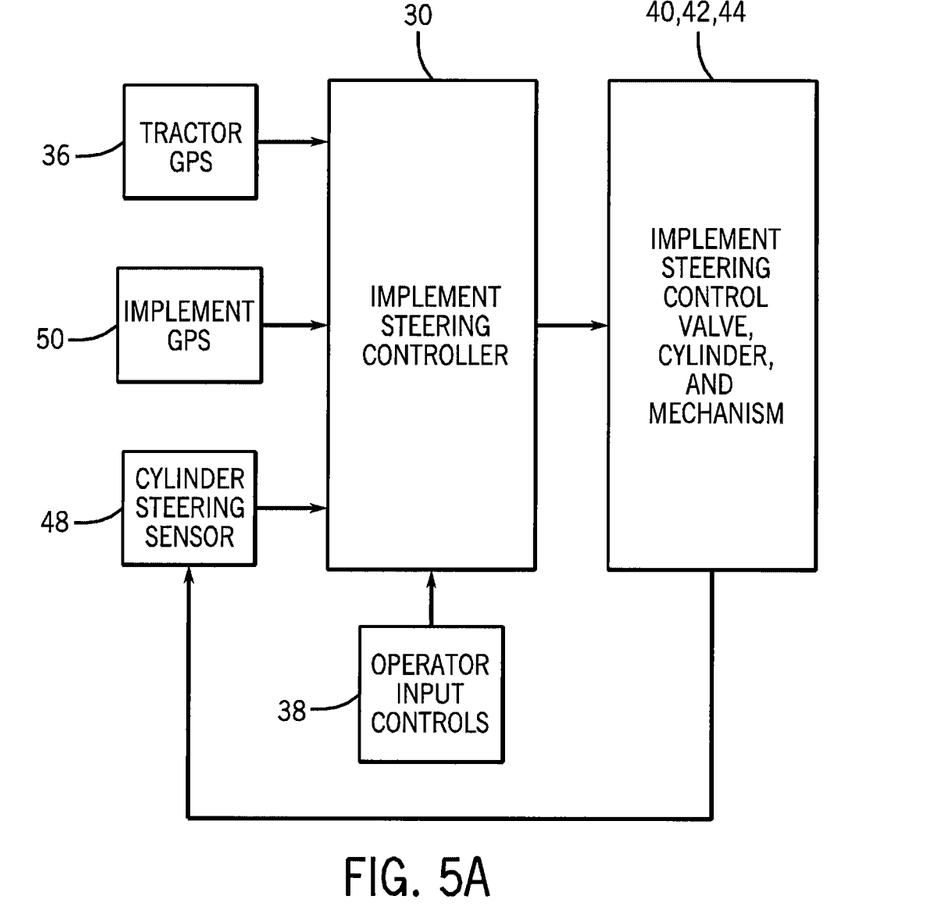
FIG. 5A is a schematic representation of an implement control system for use with the agricultural system shown in FIG. 5.

FIGS. 5 and 5A illustrate an embodiment similar to FIGS. 4 and 4A, except that the cylinder steering sensor 48, described above as being used to indirectly measure angular displacement of the inner wheels 28, is used rather than the rotary position sensor 32. In this regard, the embodiment illustrated in FIGS. 5 and 5A is a combination of the embodiment of FIGS. 3 and 4.

Figure 6:
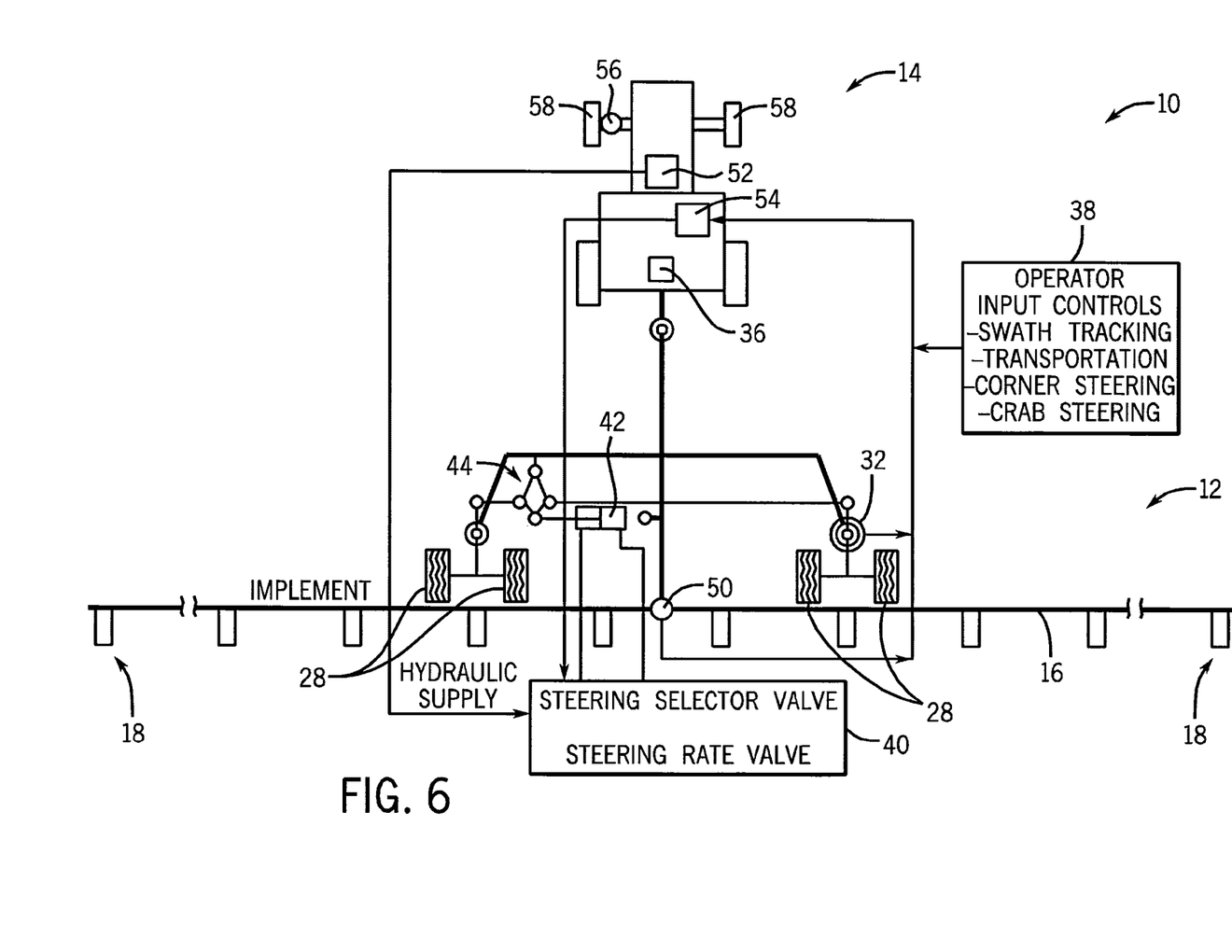
FIG. 6 is a schematic representation of the agricultural system of FIG. 1 according to a fifth embodiment of the invention.
Figure 6A:
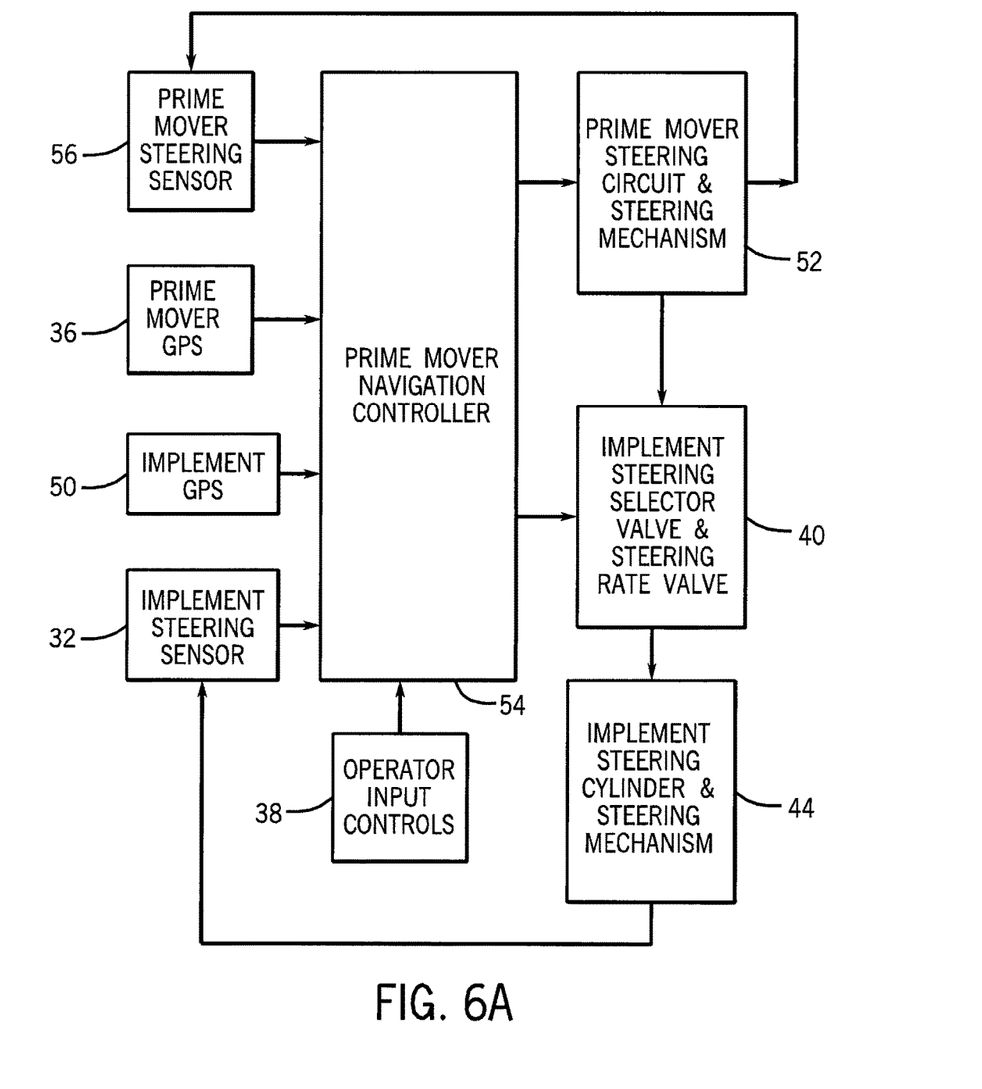
FIG. 6A is a schematic representation of an implement control system for use with the agricultural system shown in FIG. 6.

FIGS. 6 and 6A illustrate another embodiment of the present invention that is suited for use with a prime mover 14 having a steering circuit 52 that auto-steers the prime mover based on steering commands provided thereto by a prime mover navigation controller 54. The navigation controller 54 receives field position information of the tractor 14 from a GPS receiver 36 mounted to the tractor 14 and receives feedback from various implement mounted sensors, such as an implement steering sensor 32, an implement GPS receiver 50, and operator input controls 38. Additionally, the prime mover 14 also has a steering sensor 56 that measures the angular position of at least one wheel 58 of the prime mover 14 and provides corresponding feedback to the navigation controller 54. In this embodiment it will thus be appreciated the navigation controller 54 of the prime mover 14 provides auto-steering commands to the prime mover steering circuit 52 as well as the steering control valve 40.

The invention may also be embodied in a process, executed by a suitable processing equipment of the implement and/or the prime mover. For example, the position of the prime mover and the agricultural implement may be determined using GPS or other technology, such as field position sensors. The position of the implement and the prime mover may then be compared to respective desired positions, such as those of a predefined field course. From the comparison, appropriate course correction signals can be provided to the steering mechanisms of the prime mover and the implement to reduce the deviations between the real-time position of the prime mover and the implement from their respective desired positions.

It is contemplated that the implement may be controlled in various operating modes, such as a transportation steering mode in which implement is auto-steered to generally follow the prime mover, a cornering steering mode in which the implement is auto-steered to turn, such as at the end of a planting row, a swath tracking steering mode in which the implement is auto-steered to track predefined swaths in a field, and a crab steering mode in which the implement is auto-steered based on command signals provided by the steering controller of the prime mover.

Many changes and modifications could be made to the invention without departing from the spirit thereof. The scope of these changes will become apparent from the appended claims.

We claim:

1. An agricultural implement adapted to be towed by a prime mover, comprising:
   an implement frame supported by a pair of inner wheels disposed between a pair of outer wheels and a hitch point for hitching the frame to the prime mover, each inner wheel pivotable about a pivot axis;
   said implement frame supports a plurality of spaced apart row units that deposit granular material onto a planting surface;
   a steering sensor that measures angular position of the inner wheels relative to their respective pivot axes, and provides a first feedback signal;
   a field implement sensor mounted to the frame and operative to provide a field position feedback signal corresponding to the position of the frame;
   a steering controller including a microprocessor operatively connected to the steering sensor and the field implement sensor for receiving the first feedback signal and the field position feedback signal and being configured to generate a steering control signal in response thereto; and
   a steering device operatively connected to the steering controller and configured to receive the steering control signal therefrom, the steering device turning the inner wheels according to the steering control signal so as to steer the implement frame relative to the prime mover during towing.

2. The implement of claim 1 wherein the steering device includes a hydraulically controlled steering cylinder operative to receive hydraulic fluid and a steering control valve operative to control hydraulic fluid flow to the steering cylinder according to the steering control signal.

3. The implement of claim 2 wherein the steering cylinder includes a rod that is displaced as a function of pressure across the steering cylinder, and wherein the steering sensor includes a cylinder steering sensor associated with the steering cylinder to measure displacement of the rod.

4. The implement of claim 1 wherein the implement frame includes, a steering wheel axle to which the pair of inner wheels are mounted, and wherein the steering sensor includes a rotary steering sensor mounted to measure the angular position of the inner wheels.

5. The implement of claim 1 wherein the field implement sensor includes a towing angle sensor mounted to the frame approximate the hitch point and operative to provide a field position feedback signal.

6. The implement of claim 5 wherein the towing angle sensor is a sensor operative to measure angular displacement.

7. The implement of claim 6 wherein the towing angle sensor is one of rotary position sensor, a linear sensor and an inertial sensor.

8. The implement of claim 1 wherein the field implement sensor includes a GPS receiver mounted to the frame and operative to provide a field position feedback signal.

9. The implement of claim 1 wherein the steering controller is configured to cause movement of the implement frame in one of a plurality of operating modes, wherein the plurality of operating modes include:
   a transportation steering mode wherein the steering controller provides control signals to the steering device to cause the steering device to turn the inner wheels so as to follow the prime mover;
   a cornering steering mode wherein the steering controller provides control signals to the steering device to cause the steering device to turn the inner wheels in a cornering maneuver at a predefined field position;
   a swath tracking steering mode wherein the steering controller provides control signals to the steering device to cause the steering device to turn the inner wheels so as to track predetermined swaths in a farm field; and
   a crab steering mode wherein the steering controller provides control signals to the steering device based on steering command signals received from a steering controller of the prime mover.

10. The implement of claim 1 further comprising an operator input control for providing manual control signals to the steering controller.

11. An agricultural implement configured to be towed by a prime mover, comprising:
    a steerable implement frame having a pair of outer wheels and an axle between the outer wheels for supporting a pair of steerable wheels;

said implement frame supports a plurality of spaced apart row units that deposit granular material onto a planting surface;

a steering sensor that measures angular position of the inner wheels relative to their respective pivot axes, and provides a first feedback signal;

a field implement sensor mounted to the frame and operative to provide a field position feedback signal corresponding to the position of the implement frame;

a steering device operative to move the steerable wheels so as to steer the implement frame relative to the prime mover during towing; and a steering controller including a microprocessor operatively connected to the steering sensor and the field implement sensor for receiving the first feedback signal and the field position feedback signal and generating a control signal in response thereto, the steering controller providing the control signals to the steering device to move the steerable wheels selectively according to one of a plurality of operating modes, wherein the operating modes include:

a transportation steering mode wherein the steering controller provides control signals to the steering device to cause the steering device to turn the steerable wheels so as to follow the prime mover;

a cornering steering mode wherein the steering controller provides control signals to the steering device to cause the steering device to turn the steerable wheels in a cornering maneuver at a predefined field position;

a swath tracking steering mode wherein the steering controller provides control signals to the steering device to cause the steering device to turn the steerable wheels so as to track predetermined swaths in a field; and a crab steering mode wherein the steering controller provides control signals to the steering device based on steering command signals received from a steering controller of the prime mover.

12. The implement of claim 11 wherein the steering device includes a hydraulically controlled steering cylinder operative to receive hydraulic fluid and a steering control valve operative to control hydraulic fluid flow to the steering cylinder according to the control signals.

13. The implement of claim 12 wherein the steering cylinder includes a rod that is displaced as a function of pressure across the steering cylinder, and wherein the steering sensor includes a cylinder steering sensor associated with the steering cylinder to measure displacement of the rod.

14. The implement of claim 11 wherein the steering sensor includes a rotary steering sensor mounted to measure the angular position of the wheels.

15. The implement of claim 11 wherein the field implement sensor includes a towing angle sensor mounted to the implement frame and operative to provide the field position feedback signal.

16. The implement of claim 15 wherein the towing angle sensor is one of rotary position sensor and an inertial sensor.

17. The implement of claim 11 wherein the field implement sensor includes a GPS receiver mounted to the frame and operative to provide the field position feedback signal.

18. An agricultural implement configured to be towed by a prime mover, comprising:

an implement frame supported above a field surface by a set of inner wheels disposed between a set of outer wheels;

said implement frame supports a plurality of spaced apart row units that deposit granular material onto a planting surface;

a steering device operative to auto-position the inner wheels so as to steer the implement frame relative to the prime mover during towing;

a towing angle sensor that measures angular displacement between the implement frame and the prime mover and provides a towing angle feedback signal;

a steering sensor that measures angular position of the set of inner wheels and provides a wheel angle feedback signal; and a steering controller including a microprocessor operatively connected to the steering sensor and the field implement sensor for receiving the towing angle feedback signal and the wheel angle feedback signal, the steering controller generating a steering control signal in response to the towing angle feedback signal and the wheel angle feedback signal and providing the steering control signal to the steering device to control auto-positioning of the set of inner wheels based on one of a plurality of steering control modes.

19. The agricultural implement of claim 18 wherein the plurality of steering control modes includes:

a transportation steering mode wherein the steering controller provides control signals to the steering device to cause the steering device to turn the inner wheels so as to follow the prime mover;

a cornering steering mode wherein the steering controller provides control signals to the steering device to cause the steering device to turn the inner wheels in a cornering maneuver at a predefined field position;

a swath tracking steering mode wherein the steering controller provides control signals to the steering device to cause the steering device to turn the inner wheels so as to track predetermined swaths in a field; and a crab steering mode wherein the steering controller provides control signals to the steering device based on steering command signals received from a steering controller or the prime mover.

20. An agricultural implement adapted to be towed by a prune mover, comprising:

an implement frame supported by a pair of inner wheels disposed between a pair of outer wheels and a hitch point for hitching the frame to the prime mover, each wheel pivotable about a pivot axis;

said implement frame supports a plurality of spaced apart row units that deposit granular material onto a planting surface;

the prime mover having a steering sensor that measures angular position of the inner wheels relative to their respective pivot axes, and provides a first feedback signal;

a field implement sensor mounted to the frame and operative to provide a field position feedback signal corresponding to the position of the frame;

a steering controller including a microprocessor operatively connected to the steering sensor and the field implement sensor for receiving the feedback signal and the field position feedback signal and generating a steering control signal in response thereto; and a steering device operatively connected to the steering controller and configured to receive the steering control signal therefrom, the steering device turning the pair of inner wheels according to the steering control signal, whereby the implement frame is steered relative to the prime mover during towing.

* * * * *